(12) United States Patent
Ann et al.

(10) Patent No.: US 7,342,535 B2
(45) Date of Patent: Mar. 11, 2008

(54) BEAM-FORMING APPARATUS AND METHOD USING A SPATIAL INTERPOLATION BASED ON REGULAR SPATIAL SAMPLING

(75) Inventors: Jong-Hoon Ann, Suwon-si (KR); Song-Hun Kim, Suwon-si (KR); Byoung-Yun Kim, Suwon-si (KR); Hye-Young Lee, Seoul (KR); Hyeon-Woo Lee, Suwon-si (KR); Achim Seebens, Duisburg (DE); Tobias Scholand, Duisburg (DE); Peter Jung, Duisburg (DE); Admir Burnic, Duisburg (DE); Arjang Hessamian-Alinejad, Duisburg (DE)

(73) Assignee: Samsung Electronics Co., Ltd., Suwon-Si (KR)

( * ) Notice: Subject to any disclaimer, the term of this patent is extended or adjusted under 35 U.S.C. 154(b) by 13 days.

(21) Appl. No.: 11/399,601

(22) Filed: Apr. 7, 2006

(65) Prior Publication Data

US 2006/0244660 A1  Nov. 2, 2006

(30) Foreign Application Priority Data

Apr. 8, 2005  (KR)  ..................  10-2005-0029630
Jan. 20, 2006  (KR)  ..................  10-2006-0006504

(51) Int. Cl.
*H01Q 3/00* (2006.01)
(52) U.S. Cl. .................. 342/377; 342/154; 342/373
(58) Field of Classification Search .................. 342/81, 342/154, 157, 373, 377–378, 442
See application file for complete search history.

(56) References Cited

U.S. PATENT DOCUMENTS

| 7,148,845 | B2* | 12/2006 | Rooyen et al. | ............. 342/377 |
| 2002/0090978 | A1* | 7/2002 | Petrus et al. | ................ 455/562 |
| 2003/0206132 | A1* | 11/2003 | Phelan et al. | ............... 342/157 |
| 2005/0259006 | A1* | 11/2005 | Kim et al. | .................. 342/377 |
| 2005/0271016 | A1* | 12/2005 | Kim et al. | .................. 370/332 |

* cited by examiner

*Primary Examiner*—Dao Phan
(74) *Attorney, Agent, or Firm*—Roylance, Abrams, Berdo & Goodman, LLP

(57) ABSTRACT

A beam-forming apparatus and method for improving system performance using a spatial interpolation and at least one Angle of Arrival (AoA) in a system based on regular spatial sampling is provided. The AoA is estimated using a carrier-to-interference ratio. Beam-forming angles are distributed and steered in a predefined scheme such that an identical process is applied in all directions. According to this steering, a linear system model is computed based on regular spatial sampling using regular spatial separation at beam angles. Beam-forming performance is improved by compensating for a difference between adaptive and sector-type arrays. Only the steps of computing a spatial interpolation and determining an angle range for beam-forming using at least one AoA are added. The precision of estimating an AoA and the precision of beam-forming increase without an additional antenna. Because the system is simpler than that of an adaptive beam-forming system, significant gain is obtained.

40 Claims, 8 Drawing Sheets

BEAM-FORMING APPARATUS AND METHOD USING A SPATIAL INTERPOLATION BASED ON REGULAR SPATIAL SAMPLING

PRIORITY

This application claims the benefit under 35 U.S.C. § 119(a) of Korean patent application nos. 2005-29630 and 2006-6504, filed Apr. 8, 2005, and Jan. 20, 2006, respectively, in the Korean Intellectual Property Office, the entire contents of both of which are hereby incorporated by reference.

BACKGROUND OF THE INVENTION

1. Field of the Invention

The present invention generally relates to an array antenna system. More particularly, the present invention relates to an apparatus and method for optimal beam-forming for transmitting and receiving high-speed data at high performance based on a regular spatial interpolation.

2. Description of the Related Art

Reception quality of radio signals is affected by many natural phenomena. One of the natural phenomena is temporal dispersion caused by signals reflected on obstacles in different positions in a propagation path before the signals arrive at a receiver. With the introduction of digital coding in a wireless system, a temporal dispersion signal can be successfully recovered using a Rake receiver or equalizer.

Another phenomenon called fast fading or Rayleigh fading is spatial dispersion caused by signals dispersed in a propagation path by an object located a short distance from a transmitter or a receiver. If signals received through different spaces, that is, spatial signals, are combined in an inappropriate phase region, the sum of the received signals is very low in intensity, approaching zero. This becomes a cause of fading dips where received signals substantially disappear, and the fading dip occurs as frequently as a length corresponding to a wavelength.

A known method of removing fading is to provide an antenna diversity system to a receiver. The antenna diversity system is provided with two or more spatially separated receive antennas. Signals received by the respective antennas have a low relation in fading, reducing the possibility that the two antennas will simultaneously generate the fading dips.

Another phenomenon is interference that is severe at the time of radio transmission. Interference is defined as an undesired component received through a desired signal channel. In a cellular radio system, interference is directly related to a requirement of communication capacity. Because resources of radio spectra are limited, a radio frequency band given to a cellular operator should be efficiently used.

Due to increasing use of cellular systems and their deployment over increasing numbers of geographic locations, research is being conducted on an array antenna geometry connected to a Beam-former (BF) as a new scheme for increasing traffic capacity by removing any influences of interference and fading. Each antenna forms a set of antenna beams. A signal transmitted from a transmitter is received in each of the antenna beams, and spatial signals experiencing different spatial channels are maintained by individual angular information. The angular information is determined according to a phase difference between different signals. Direction estimation of a signal source is achieved by demodulating a received signal. A direction of a signal source is indicated by a Direction of Arrival (DoA).

FIG. 1 illustrates an example of a Node B with an array antenna, which communicates with a plurality of User Equipment (UE) (or Mobile Stations (MSs)). Referring to FIG. 1, a Node B 10 has an array antenna 20 provided with four antenna elements. Five Users A, B, C, D and E are located in a service area of the Node B 10. A receiver 15 selects signals from desired users of the five users through beam-forming. Because the array antenna 20 of FIG. 1 has only the four antenna elements, the receiver 15 recovers signals from a maximum of four users, for example, signals from Users A, B, D and E as illustrated in FIG. 1 through beam-forming.

FIG. 2 illustrates, as an example, spatial characteristics of beam-forming for selecting a signal from User A. As illustrated in FIG. 2, a very high weight, or gain, is applied to a signal from User A, while a gain close to zero is applied in directions from the other users.

Estimation of a DoA is used to select an antenna beam for signal transmission in a desired direction or to steer an antenna beam in a direction where a desired signal is received. A beam-former estimates steering vectors and DoAs for simultaneously detected multiple spatial signals, and determines beam-forming weight vectors from a set of the steering vectors. The beam-forming weight vectors are used for recovering signals. Algorithms used for beam-forming are Multiple Signal Classification (MUSIC), Estimation of Signal Parameters via Rotational Invariance Techniques (ESPRIT), Weighted Subspace Fitting (WSF), and Method of Direction Estimation (MODE).

An adaptive beam-forming process depends on exact information about spatial channels. Therefore, adaptive beam-forming can generally only be accomplished after estimation of the spatial channels. This estimation should consider not only temporal dispersion of channels, but also DoAs of radio waves received at a receive antenna.

In an antenna diversity system using an array antenna, resolvable beams are associated with arrival directions of maximum incident waves. In order to achieve beam-forming, a receiver should acquire information about a DoA, and the information about the DoA can be obtained through DoA estimation. However, estimated DoAs are not regularly spaced apart from each other. Therefore, in a digital receiver, conventional beam-forming includes irregular spatial samplings. The ultimate goal of beam-forming is to separate an incident wave so as to fully use spatial diversity in order to suppress fading. However, its latent faculty is limited by the geometry of an array antenna having a finite spatial resolution.

Because a single-path channel is considered in a typical multipath and multiuser scenario, multi-path channels cannot be used in actual communication environments. Spatial selective channel estimation based on irregular spatial sampling proposed to solve this problem requires considerably complex implementation. Thus, a method based on regular spatial sampling has been proposed. The regular spatial sampling technique simplifies an Angle of Arrival (AoA) estimation and beam-forming process on the basis of the regular spatial sampling using a set of antenna elements uniformly distributed over the same circumference of a circle. This method estimates an AoA as a primary angle of an antenna element with the maximum received energy value.

FIG. 3 illustrates a structure of a receiver 300 of a conventional array antenna system, and FIG. 4 is a flowchart illustrating operations of an interference and noise estimator 340, a channel estimator 350, and a beam-former 360 in the receiver 300. Next, the respective components will be described in more detail.

Referring to FIG. 3, an antenna 310 is an array antenna with antenna elements of a predetermined combination structure, and receives a plurality of spatial signals that are incident thereupon through spaces. In an example of FIG. 3, incident plane waves are received in one direction at the antenna elements with different phases. Multipliers 320 multiply outputs of their associated antenna elements by antenna element-by-antenna-element weights set by the operation of the beam-former 360, respectively. A data detector 330 performs frequency down-conversion, demodulation, and channel selection on the weighted outputs of the antenna elements, thereby generating a digital data signal.

In step 410 of FIG. 4, the interference and noise estimator 340 estimates the interference power and the spectral noise density $N_0$ of the thermal noise power using the data signal provided from the data detector 330. A covariance matrix indicative of the noise power is computed from a combined noise vector obtained by using the estimated interference power and the estimated spectral noise density. Because a received data signal is absent if a beam is first formed, the interference power is initialized to an arbitrary value and therefore the noise power is computed.

In step 420, the channel estimator 350 computes a phase matrix $\underline{A}_s$, including a phase factor $\Phi$ associated with User k and Antenna Element $k_a$ using $N_b$ predetermined DoA values, computes directional channel impulse response vectors $\underline{\hat{h}}_d$ using Equation (1), and computes combined channel impulse response vectors $\underline{h}$ by multiplying the directional channel impulse response vectors by the phase matrix.

$$\underline{\hat{h}}_d = (A_s^H (I_{k_a} \hat{x} G^H) \underline{R}_n^{-1} (I_{k_a} \hat{x} G^H))^{-1} A_s^H (I_{k_a} \hat{x} G^H) \underline{R}_n^{-1} e \quad \text{Equation (1)}$$

In Equation (1), the matrix $\underline{G}$ is a midamble known between a transmitter and a receiver and $\underline{e}$ is a combined received signal vector. $I_{k_a}$ is a $(k_a * k_a)$ identity matrix and $\underline{R}_n$ is a covariance matrix indicative of the total noise power between antenna elements.

In step 430, the channel estimator 350 evaluates channel estimates with antenna element-by-antenna-element energies with respect to the directional channel impulse response vectors, and ranks energies $\|\underline{\hat{h}}_d^{(k,n_a)}\|^2$ of the directional channel impulse responses estimated in directions $n_a$ for all K users in order of magnitude.

In step 440, the channel estimator 350 selects one direction with the maximum impulse response energy for each user, maintains only the channel impulse response energy in the selected direction, sets energies of all other channel impulse responses to zero, and forms modified directional channel impulse response $\underline{\hat{h}}_{d,mod}$. The modified directional channel impulse responses are used to compute the final combined channel impulse vectors $\underline{\hat{h}}$ along with the phase matrix $\underline{A}_s$ using the fixed DoA values.

In step 450, the beam-former 360 computes steering vectors for adaptive beam-forming in all directions on the antenna element-by-antenna-element basis using the computed combined channel impulse response vectors $\underline{\hat{h}}$. In step 460, the beam-former 360 performs beam-forming using the combined channel impulse response vectors and the steering vectors in estimated DoA of incident waves.

The beam-forming method based on the above-described regular spatial sampling can simply implement a system because it is simpler than an adaptive beam-forming method. In terms of implementation, the beam-forming method based on the above-described regular spatial sampling can obtain a significant gain. However, it is difficult for this method to correctly estimate the location of a target UE because a given space is regularly divided and a direction/angle of a signal arrived in a region of the divided space is indicated by one DoA value. Accordingly, the performance of the beam-forming system is degraded. The performance can be improved by increasing the number of antenna elements to solve the problem. When this occurs, the complexity and cost of the system increase.

SUMMARY OF THE INVENTION

Accordingly, the present invention has been designed to address the above and other problems occurring in the prior art. Therefore, exemplary embodiments of the present invention provide an apparatus and method that estimate spatial channels and form beams without considering DoAs of maximum incident waves requiring irregular spatial sampling in an antenna diversity system.

Moreover, exemplary embodiments of the present invention provide an apparatus and method that compute in advance a linear system model based on regular spatial sampling using a regular spatial separation at beam angles, thereby reducing the complexity of channel estimation.

In accordance with an aspect of exemplary embodiments of the present invention, there is provided a beam-forming apparatus for an antenna diversity system with an array antenna configured by a plurality of antenna elements. The beam-forming apparatus comprises an interference and noise calculator for estimating an interference power and a spectral noise density of a radio channel with a signal received via the radio channel from a user, and computing a total noise power of the radio channel according to the interference power and the spectral noise density. The beam-forming apparatus further comprises a channel estimator for estimating directional channel impulse responses at beam-forming angles mapped to a antenna elements using the total noise power, an AoA determiner for generating candidate angles of arrival that are more than the number of antenna elements, applying a spatial interpolation to energy values at the beam-forming angles according to the estimated directional channel impulse responses, evaluating the energy values at the beam-forming angles, and selecting a primary angle of arrival among the candidate angles of arrival according to the evaluated energy values. The beam-forming apparatus further comprises a beam-former for computing beam-forming weights based on differences between the angles of arrival and the selected primary angle of arrival, and applying the weights to a signal to be transmitted or received through the array antenna.

In accordance with another aspect of exemplary embodiments of the present invention, there is provided a beam-forming method for an antenna diversity system with an array antenna configured by a plurality of antenna elements. The beam-forming method comprises estimating an interference power and a spectral noise density of a radio channel with a signal received via the radio channel from a user, and computing a total noise power of the radio channel according to the interference power and the spectral noise density. The beam-forming method further comprises estimating directional channel impulse responses at beam-forming angles mapped to the plurality of antenna elements using the total noise power, setting candidate angles of arrival that are more than the number of antenna elements, applying a spatial interpolation to energy values at the beam-forming angles according to the estimated directional channel impulse responses, evaluating the energy values at the beam-forming angles, and selecting a primary angle of arrival among the candidate angles of arrival according to the evaluated energy values. The beam-forming method further comprises computing beam-forming weights based on differences between the beam-forming angles and the selected primary angle of arrival, applying the beam-forming weights to the plurality of antenna elements of the array antenna, and performing beam-forming.

In accordance with another aspect of exemplary embodiments of the present invention, there is provided a beam-forming apparatus for an antenna diversity system with an array antenna configured by a plurality of antenna elements. The beam-forming apparatus comprises an interference and noise calculator for estimating an interference power and a spectral noise density of a radio channel with a signal received via the radio channel from a user, and computing a total noise power of the radio channel according to the interference power and the spectral noise density. The beam-forming apparatus further comprises a channel estimator for estimating directional channel impulse responses at beam-forming angles mapped to the plurality of antenna elements using the total noise power, an AoA determiner for generating candidate angles of arrival that are more than the number of antenna elements, applying a spatial interpolation to energy values at the beam-forming angles according to the estimated directional channel impulse responses, evaluating the energy values at the beam-forming angles, and selecting primary and secondary angles of arrival closest to a direction in which the user is located among the candidate angles of arrival according to the evaluated energy values The beam-forming apparatus further comprises a beam-former for computing beam-forming weights based on the beam-forming angles and the selected primary and secondary angles of arrival, and applying the beam-forming weights to the plurality of antenna elements of the array antenna, such that beams are uniformly distributed between the primary and secondary angles of arrival.

In accordance with another aspect of exemplary embodiments of the present invention, there is provided a beam-forming method for an antenna diversity system with an array antenna configured by a plurality of antenna elements. The beam-forming method comprises estimating an interference power and a spectral noise density of a radio channel with a signal received via the radio channel from a user, and computing a total noise power of the radio channel according to the interference power and the spectral noise density. The beam-forming method further comprises estimating directional channel impulse responses at beam-forming angles mapped to the plurality of antenna elements using the total noise power, setting candidate angles of arrival that are more than the number of antenna elements, applying a spatial interpolation to energy values at the beam-forming angles according to the estimated directional channel impulse responses, evaluating the energy values at the beam-forming angles, and selecting primary and secondary angles of arrival closest to a direction in which the user is located among the candidate angles of arrival according to the evaluated energy values The beam-forming method further comprises computing beam-forming weights based on the beam-forming angles and the selected primary and secondary angles of arrival, applying the beam-forming weights to the plurality of antenna elements of the array antenna, and performing beam-forming, such that beams are uniformly distributed between the primary and secondary angles of arrival.

BRIEF DESCRIPTION OF THE DRAWINGS

The above and other exemplary features and aspects of the present invention will be more clearly understood from the following detailed description of certain exemplary embodiments taken in conjunction with the accompanying drawings, in which.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

The present invention as described below does not consider arrival directions/angles of maximum incident waves requiring irregular spatial sampling when beam-forming is performed by estimating spatial channels in an antenna diversity system. The irregular spatial sampling requires accurate time measurement and time-varying reconstruction filtering, and is more complex to implement than a regular sampling strategy. In accordance with exemplary embodiments of the present invention, a linear system model beginning at regular spatial sampling which exploits a regular spatial separation at a beam angle is computed in advance, thereby significantly reducing the complexity of channel estimation.

For spatial channel estimation, a receiving side requires the deployment of an array antenna with $K_a$ antenna elements. This array antenna serves as a spatial low-pass filter with a finite spatial resolution. Spatial low-pass filtering indicates an operation of dividing incident waves of an array antenna into spatial signals that pass through different spatial regions. A receiver with the above-described array antenna combines finite $N_b$ number of spatial signals through beam-forming. As described above, the best possible beam-forming requires information about predetermined Direction of Arrival (DoA) and temporal dispersion channel impulse responses associated with the DoAs. An $N_b$ value cannot exceed a $K_a$ value, and is the number of resolvable spatial signals. The maximum $N_b$ value, that is, max $(N_b)$, is fixed according to array antenna geometry.

In an example as described below, system antenna deployment is based on a Uniform Circular Array (UCA). That is, it assumed that antenna elements are uniformly distributed over the circumference of a circle and the total number of antenna elements is an even number. Furthermore, it is assumed that the total number of antenna elements at a Node B is $K_a$. A signal transmitted from User k is incident upon the array antenna in $N_b$ different directions. Each direction is denoted by $n_b$. A beam-forming angle for a spatial signal $n_b$ of User k is defined as shown in Equation (2).

$$\beta^{(k,n_b)} = \frac{2\pi}{N_b}(n_b - 1) \quad k = 1 \ldots K, n_b = 1 \ldots N_b \qquad \text{Equation (2)}$$

In Equation (2), K represents the number of users and $N_b$ is the number of beams, which is assumed to be identical with the number of antenna elements.

First Exemplary Embodiment

Figure 1:
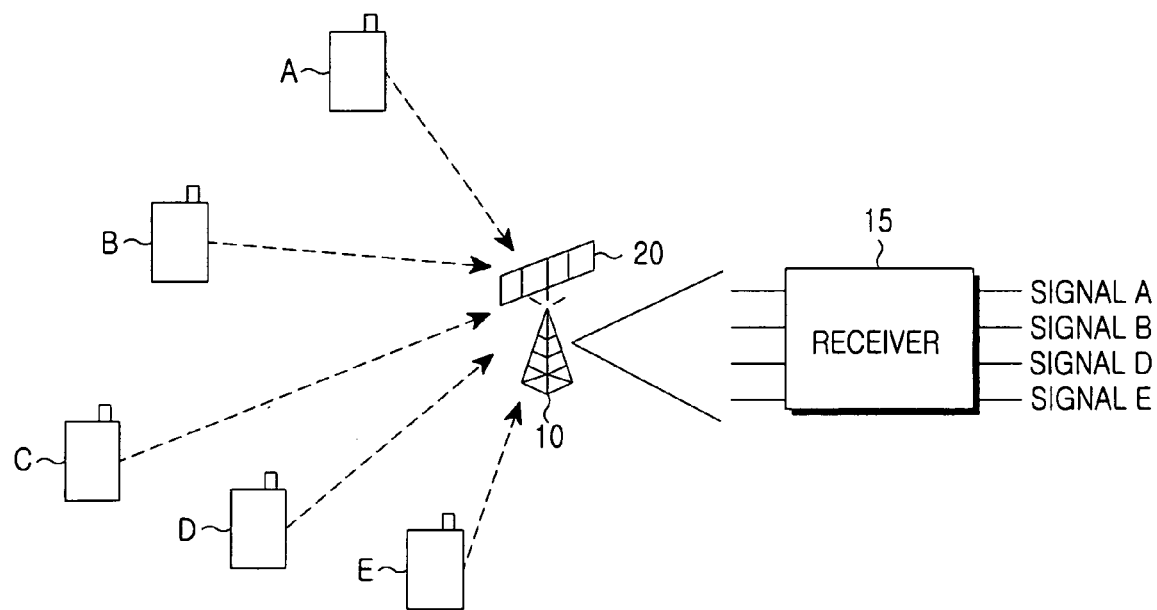
FIG. 1 illustrates an example of a Node B with an array antenna that communicates with a plurality of User Equipment (UE)
Figure 2:
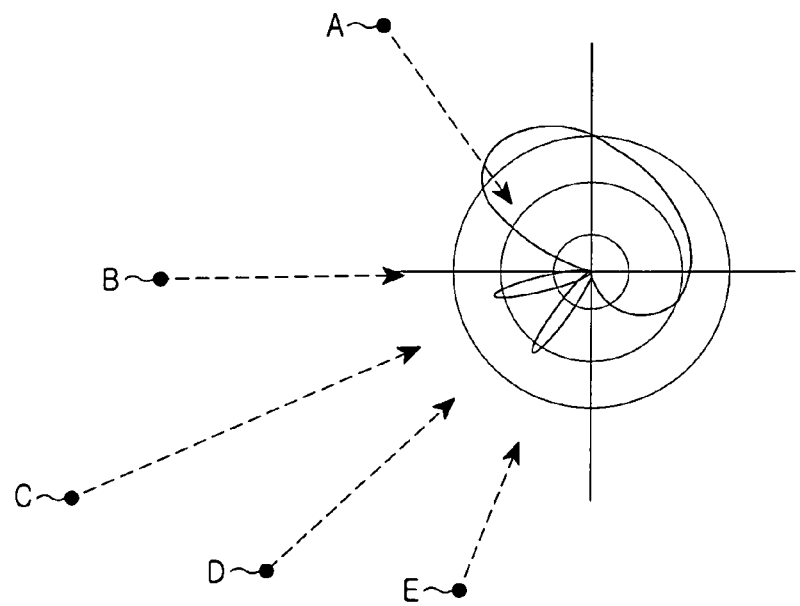
FIG. 2 is a polar plot illustrating spatial characteristics of beam-forming for selecting a signal from one user.
Figure 3:
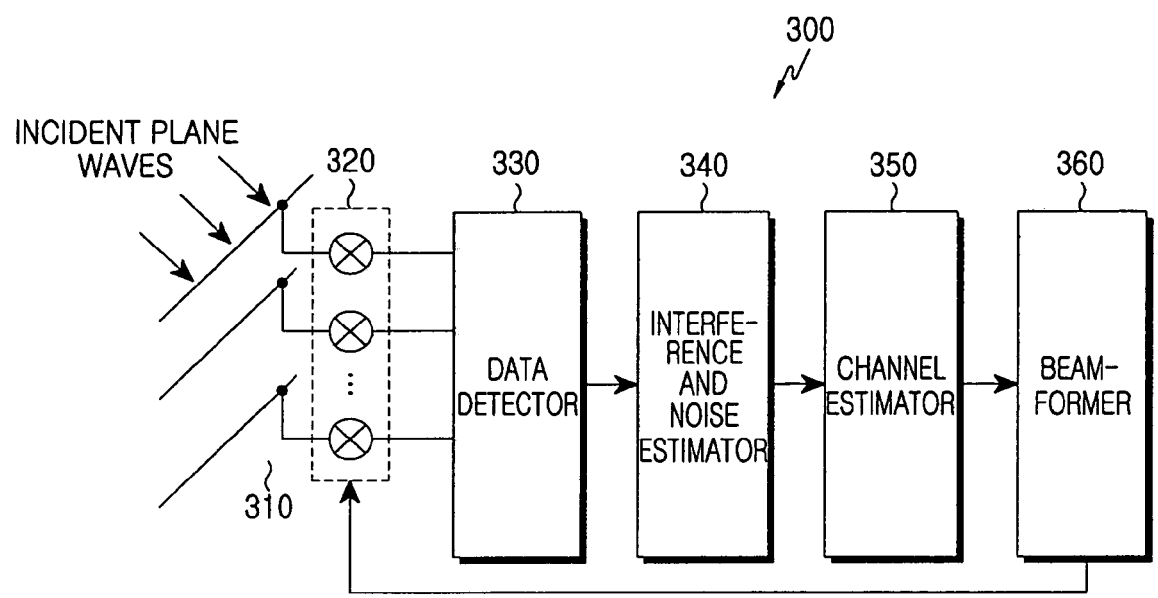
FIG. 3 is a schematic block diagram illustrating a conventional transceiver.
Figure 4:
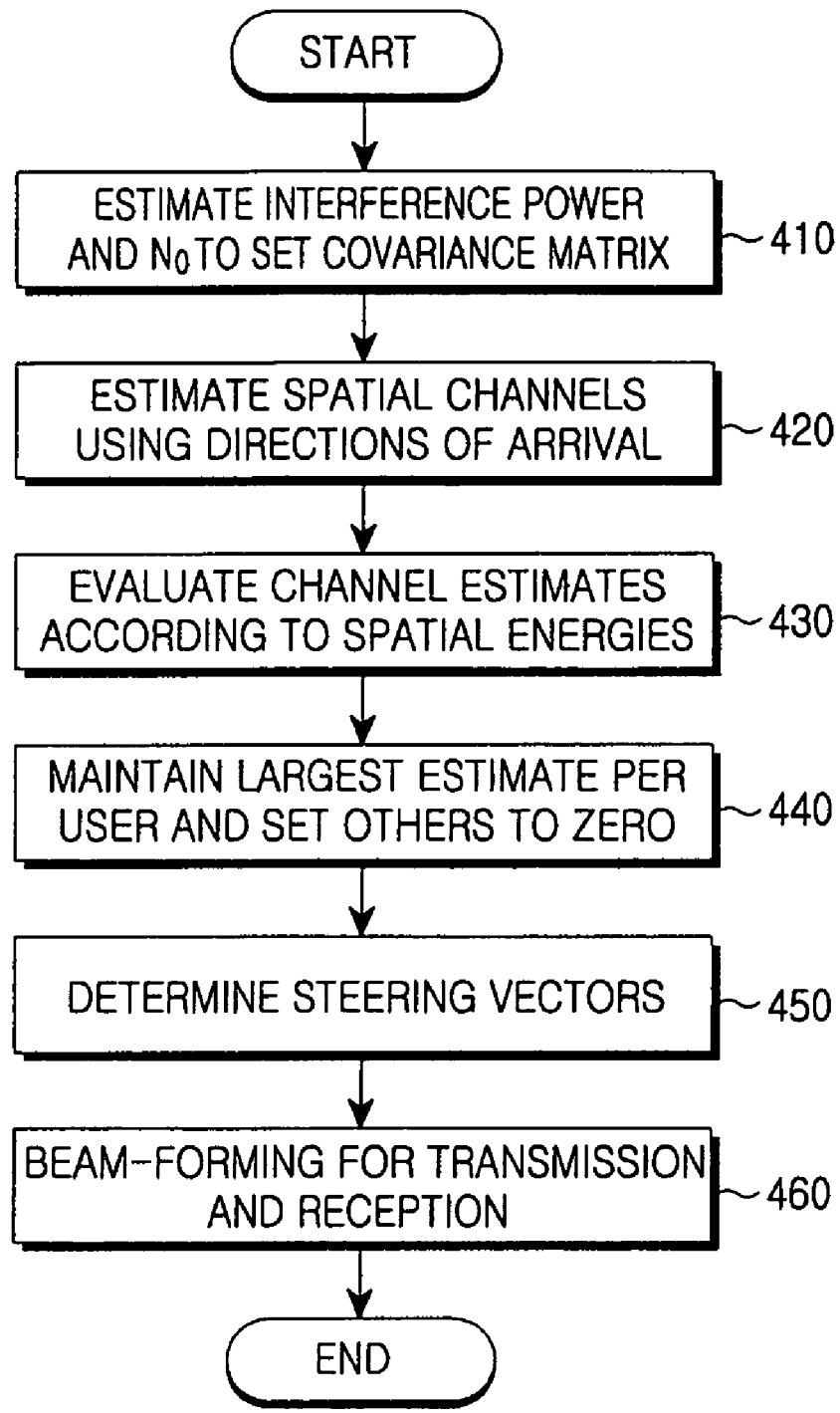
FIG. 4 is a flowchart illustrating a conventional beam-forming procedure.
Figure 5:
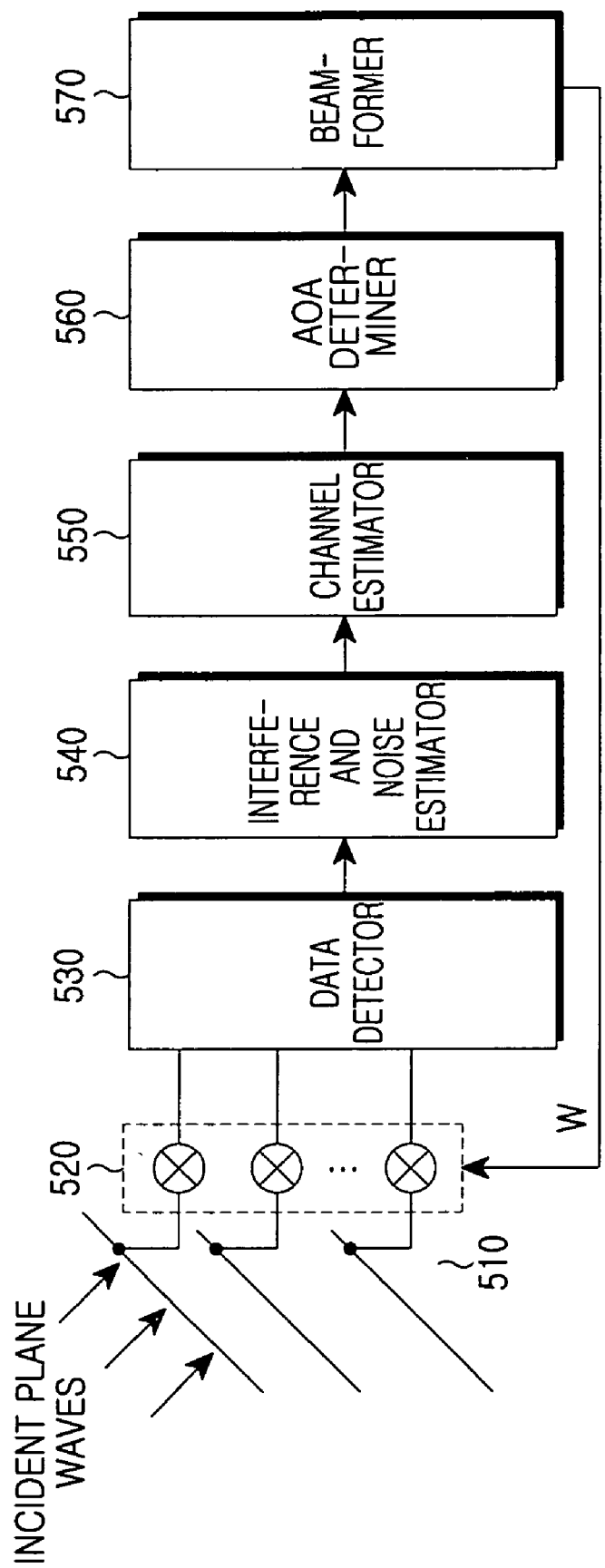
FIG. 5 is a schematic block diagram illustrating a beam-forming transceiver using a spatial interpolation in accordance with a first exemplary embodiment of the present invention.

FIG. 5 is a schematic block diagram illustrating a beam-forming transceiver using a spatial interpolation in accordance with a first exemplary embodiment of the present invention.

Referring to FIG. 5, a signal received through an array antenna 510, which can comprise incident plane waves received at the antenna elements with different phases, is demodulated to a data signal through a data detector 530. The data signal is input to an interference and noise estimator 540. The interference and noise estimator 540 estimates the interference power and the spectral noise density $N_0$ of the thermal noise power using the data signal provided from the data detector 530. An output of the interference and noise estimator 540 is input to a channel estimator 550. The channel estimator 550 computes channel impulse response information. At this time, channel impulse responses are computed on the basis of antenna elements and users for performing communication through the array antenna 510. As a result, an output of the channel estimator 550 is an estimation matrix of the channel impulse responses.

The channel impulse responses estimated by the channel estimator 550 are input to an Angle of Arrival (AoA) determiner 560 for determining a primary AoA using a spatial interpolation and a Signal-to-Noise Ratio (SNR). Herein, the primary AoA indicates a direction in which a received signal is predicted to be present. Functions of the AoA determiner 560 are as follows:

1. Evaluate an energy value in every path of arrival;
2. Generate candidate angles of arrival that are more than the number of antenna elements;
3. Evaluate energy per candidate AoA using the spatial interpolation;
4. Evaluate energy at each candidate AoA using the spatial interpolation and a Directional Channel Impulse Response (DCIR); and
5. Determine a primary AoA.

The functions will be described in more detail with reference to FIG. 6. When the primary AoA is determined, the AoA determiner 560 inputs the primary AoA to a beam-former 570. Then, the beam-former 570 sets proper weights (W) on an antenna element-by-antenna-element basis according to the primary AoA and provides the weights to multipliers 520, such that antenna elements form beams in a direction mapped to the primary AoA.

Figure 6:
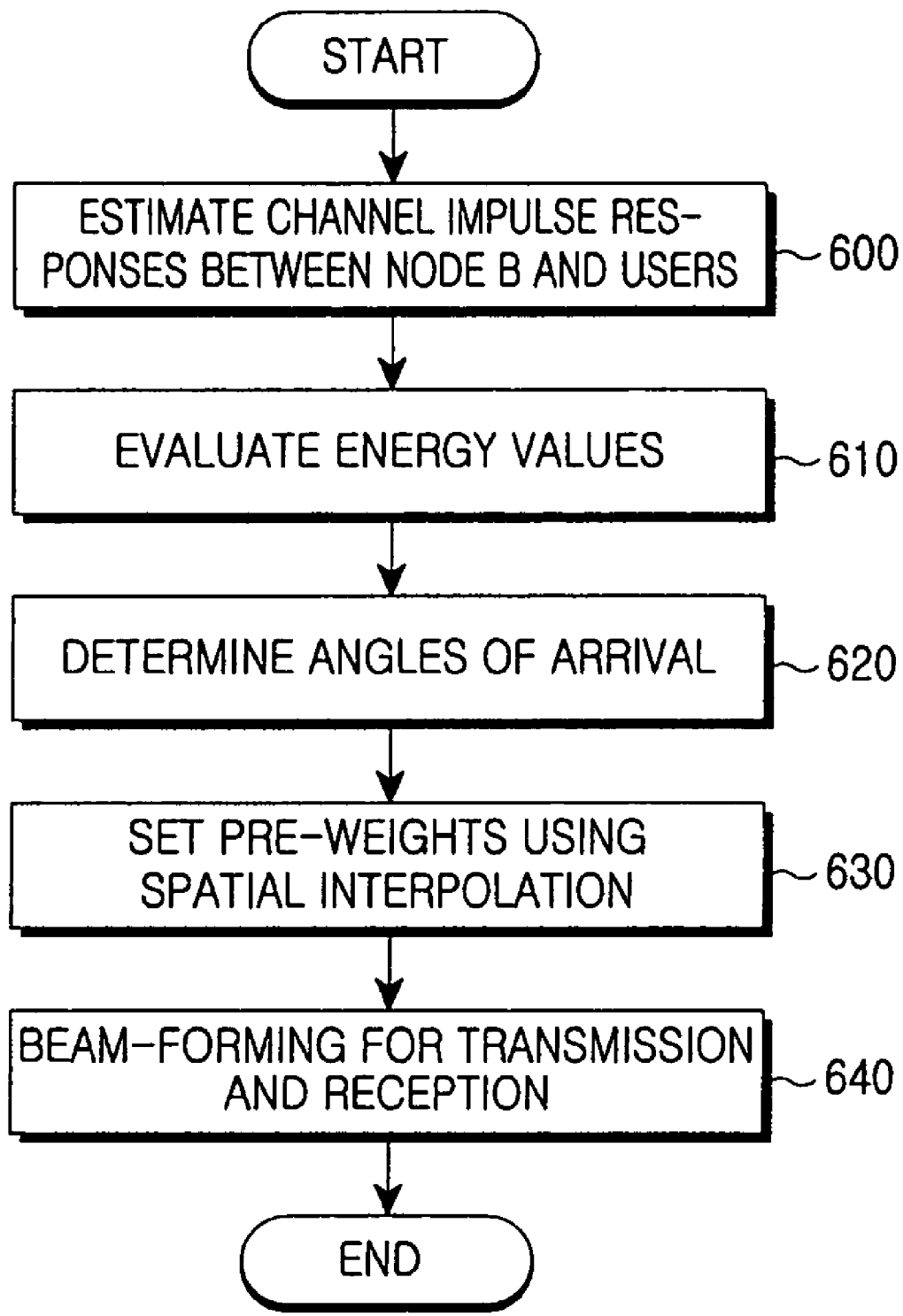
FIG. 6 is a schematic flowchart illustrating a beam-forming procedure using the spatial interpolation in accordance with the first exemplary embodiment of the present invention.

FIG. 6 is a schematic flowchart illustrating a beam-forming procedure using the spatial interpolation in accordance with the first exemplary embodiment of the present invention. An operation will be described step-by-step.

Referring to FIG. 6, the channel estimator 550 estimates directional channel impulse responses $\underline{h}_d$ between users and antenna elements of a Node B in step 600. $\underline{h}_d$ is a matrix with elements of $\hat{\underline{h}}_d^{(k,n_a)}$ according to User k and Antenna Element $n_b$. Subscript d denotes the directivity and a hat ^ denotes an estimated value. The magnitude of the directional channel impulse response matrix depends on the number of beams, that is, the number of antenna elements and the number of users. The estimated directional channel impulse responses are transferred to step 610 for evaluating energy values at angles of arrival.

Figure 7A:
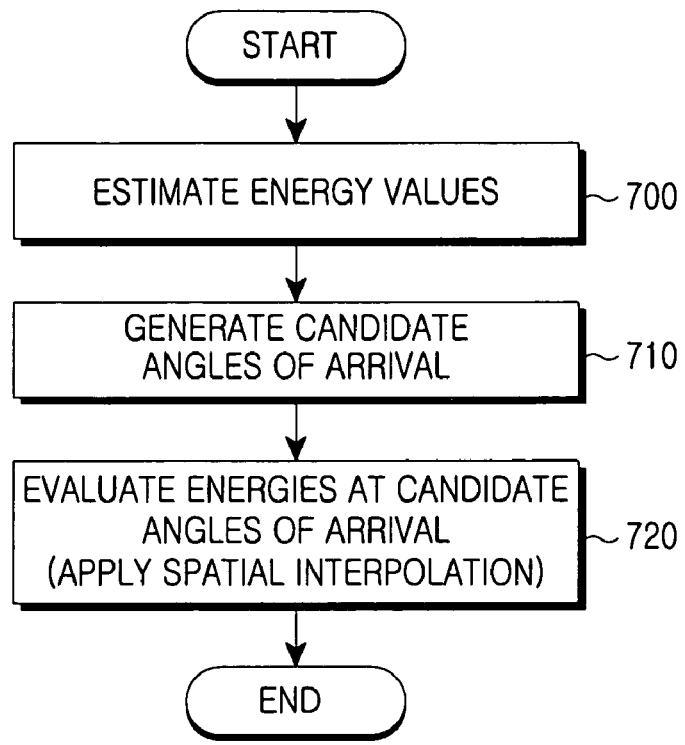
FIGS. 7A and 7B are flowcharts illustrating an energy evaluation process in accordance with an exemplary embodiment of the present invention.
Figure 7B:
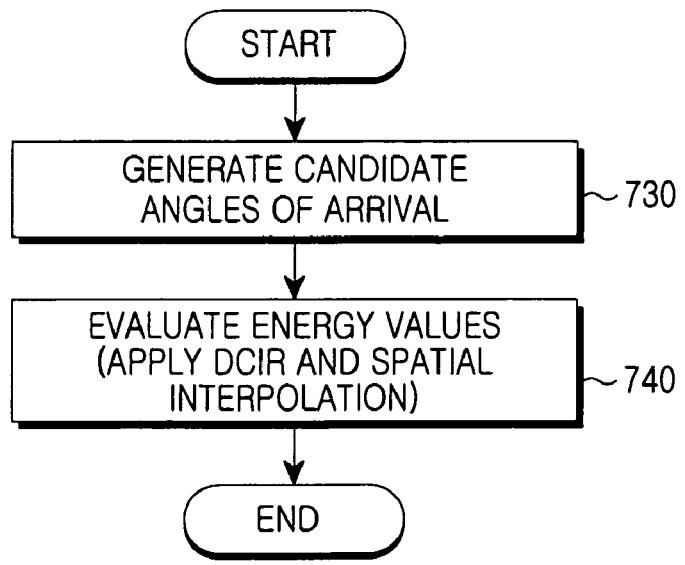

In accordance with an exemplary embodiment of the present invention, the AoA determiner 560 can perform step 610 to evaluate the energy values at the angles of arrival according to a procedure as illustrated in FIG. 7A or 7B. The same results can be obtained when the procedures of FIGS. 7A and 7B evaluate the energy values in step 610 of FIG. 6. Both the procedures of FIGS. 7A and 7B do not need to be performed.

First, the operation for evaluating the energy values in accordance with the first exemplary embodiment as illustrated in FIG. 7A is as follows. In step 700, the energy values are estimated with the estimated directional channel impulse responses. An energy value between User k and Antenna Element $n_b$ is estimated according to the directional channel impulse responses as shown in Equation (3).

$$\hat{E}_d^{(k,n_b)} = \|\underline{\hat{h}}_d^{(k,n_b)}\| \qquad \text{Equation (3)}$$

After the energy values are estimated in step 700, candidate angles of arrival are generated in step 710. Specifically, step 710 generates $N_c$ candidate angles of arrival that are more than the number of beams, $N_b$, identical with the number of antenna elements. When a v-th candidate AoA is denoted by $\beta_v$, it is expressed as shown in Equation (4).

$$\beta_v = \frac{2\pi}{N_c}(v - 1) \quad v = 1 \ldots N_c \quad N_c > N_b \qquad \text{Equation (4)}$$

A set of the generated candidate angles of arrival is used for energy evaluation at each candidate AoA in step 720. In step 720, an energy value at each candidate AoA is computed using a spatial interpolation. Step 720 comprises the following.

The AoA determiner 560 computes Equation (5) with the energy values computed in step 710 and the candidate AoAs generated in step 720.

$$E_d^{(k)}(\beta_v) = \sum_{n_b=1}^{N_b} \hat{E}_d^{(k,n_b)} t_{pSLP}(\beta^{(k,n_b)} - \beta_v),$$

$$k = 1 \ldots K, \quad v = 1 \ldots N_c$$

Equation (5)

In Equation (5), $E_d^{(k)}(\beta_v)$ is an energy value of User k evaluated at a candidate AoA $\beta_v$, and $\beta^{(k,n_b)}$ is a beam-forming angle for a spatial signal $n_b$ of User k as shown in Equation (2). $t_{pSLP}$ of Equation (5) is a spatial interpolation coefficient for applying the spatial interpolation based on periodic spatial low pass filtering (pSLP), and is defined as shown in Equation (6).

$$t_{pSLP}(\beta) = \frac{1}{N_b}\left[1 + \cos\{N_b\beta/2\} + 2\sum_{v=1}^{(N_b/2)-1} \cos\{v\beta\}\right]$$

Equation (6)

In Equation (6), the spatial interpolation coefficient has a constant value at an antenna element's angle ($\beta=\beta^{(k,n_b)}$) among candidate AoAs according to regular spatial sampling, but has a median value between known interpolation coefficients at adjacent DoAs, as to coefficients at other angles. When the antenna elements have a UCA corresponding to a middle form between sector and adaptive-type arrays, angles of the deployed antenna elements are angles of direction (DoAs) according to the regular spatial sampling. As a result, a median value between energy values at the known adjacent DoAs is taken in relation to an angle at which an antenna element is not deployed. This is based on gradual variations rather than sudden variations in spatial characteristics according to angular variations. In other words, the spatial interpolation technique computes a median energy value according to angular variations.

When the energy values estimated in step 700 are denoted in the form of a vector, it is expressed as shown in Equation (7).

$$\hat{\epsilon}_d^{(k)} = [\hat{E}_d^{(k,1)} \hat{E}_d^{(k,2)} \ldots \hat{E}_d^{(k,n_b)} \ldots \hat{E}_d^{(k,N_b)}]^T,$$
$$k=1 \ldots K$$

Equation (7)

Spatial interpolation coefficients used in step 720 are expressed as a spatial interpolation matrix $T_{pSLP}^{(k)}$ as shown in Equation (8).

$$T_{pSLP}^{(k)} = \begin{bmatrix} t_{pSLP}(\beta^{(k,1)} - \beta_1) & t_{pSLP}(\beta^{(k,1)} - \beta_2) & \cdots & t_{pSLP}(\beta^{(k,1)} - \beta_{N_c}) \\ t_{pSLP}(\beta^{(k,2)} - \beta_1) & t_{pSLP}(\beta^{(k,2)} - \beta_2) & & t_{pSLP}(\beta^{(k,2)} - \beta_{N_c}) \\ \vdots & \vdots & \ddots & \vdots \\ t_{pSLP}(\beta^{(k,N_b)} - \beta_1) & t_{pSLP}(\beta^{(k,N_b)} - \beta_2) & \cdots & t_{pSLP}(\beta^{(k,N_b)} - \beta_{N_c}) \end{bmatrix}, \quad k=1 \ldots K$$

Equation (8)

A matrix of energy values at candidate angles of arrival computed by Equations (7) and (8) in step 720 is given as shown in Equation (9).

$$\epsilon_{d,int.}^{(k)T} = \hat{\epsilon}_d^{(k)T} T_{pSLP}^{(k)} = [E_d^{(k)}(\beta 1_c) E_d^{(k)}(\beta_{2_c}) \ldots$$
$$E_d^{(k)}(\beta_{N_c})]^T, k=1 \ldots K$$

Equation (9)

As a result, the AoA determiner 560 obtains energy values at the candidate angles of arrival in step 720.

The energy values computed at the candidate angles of arrival obtained according to the procedure of FIG. 7A are used to determine a primary AoA in step 620. The AoA determiner 560 determines the primary AoA on the basis of the energy values computed at the candidate angles of arrival in step 620. A basic determination criterion is to select one AoA with the maximum energy value among the energy values at the candidate angles of arrival. Step 620 is defined as shown in Equation (10).

$$\beta^{(k)} = \underset{v=1}{\overset{N_c}{\operatorname{argmax}}}\{E_d^{(k)}(\beta_v)\}, \quad k = 1 \ldots K$$

Equation (10)

Equation (10) is used in a process for selecting a candidate AoA with the maximum energy value for each user as a primary AoA $\beta^{(k)}$ of User k.

In step 630, the beam-former 570 sets pre-weights for beam-forming based on primary angles of arrival selected on a user-by-user basis in step 620. Herein, the pre-weights are obtained by applying the spatial interpolation to general weights.

For a better understanding of a beam-forming operation, the conventional beam-forming method will be briefly described as follows.

A beam-forming direction in the regular spatial sampling scheme is fixed and is expressed as shown in Equation (11).

$$\beta^{(k,n_b)} = \frac{2\pi}{N_b}(n_b - 1) \; k = 1 \ldots K, n_b = 1 \ldots N_b$$

Equation (11)

Equation (11) is equal to Equation (2) as described above. A phase of a spatial signal with an AoA of Equation (11) is expressed as shown in Equation (12).

$$\psi(k, k_a, n_b) = 2\pi \frac{l^{(k_a)}}{\lambda} \cdot \cos(\beta^{(k,n_b)} - \alpha^{(k_a)})$$

$$k = 1 \ldots K, k_a = 1 \ldots K_a, n_b = 1 \ldots N_b$$

Equation (12)

In Equation (12), k(=1 ... K) is a user index, $k_a$(=1 ... $K_a$) is an antenna element index, and $n_b$(=1 ... $N_b$) is a spatial signal index. An angle $\alpha$ is associated with the physical deployment of antenna elements. That is, $\alpha^{(k_a)}$ is an angle between a virtual straight line and a reference line passing through a predetermined antenna array reference point, and is a value known in a receiver according to the array antenna geometry. The virtual straight line is connected between the predetermined antenna array reference point and antenna elements deployed at a predetermined distance from each other. An angle $\beta^{(k,n_b)}$ is an AoA of a radian unit indicating a direction of an $n_b$-th spatial signal incoming from User k on the basis of the reference line. $\lambda$ is a wavelength at a subcarrier frequency and $l^{(k_a)}$ is a distance between a $k_a$-th antenna element and the antenna array reference point.

A steering vector according to the phase is expressed as shown in Equation (13).

$$\underline{b}_s^{(k,nb)} = (e^{j\psi(k,1,n_b)} \ldots e^{j\psi(k,k_a,n_b)})^T, k=1 \ldots K,$$
$$n_b = 1 \ldots N_b \quad \text{Equation (13)}$$

Equation (14) is a matrix of steering vectors for all users and all antenna elements.

$$\underline{B}_s^{(k)} = \quad \text{Equation (14)}$$

$$\begin{pmatrix} e^{j\psi(k,1,1)} & e^{j\psi(k,1,2)} & \ldots & e^{j\psi(k,1,n_b)} & \ldots & e^{j\psi(k,1,N_b)} \\ e^{j\psi(k,2,1)} & e^{j\psi(k,2,2)} & \ldots & e^{j\psi(k,2,n_b)} & \ldots & e^{j\psi(k,2,N_b)} \\ \vdots & \vdots & \vdots & \vdots & \vdots & \vdots \\ e^{j\psi(k,k_a,1)} & e^{j\psi(k,k_a,2)} & \ldots & e^{j\psi(k,k_a,n_b)} & \ldots & e^{j\psi(k,k_a,N_b)} \\ \vdots & \vdots & \vdots & \vdots & \vdots & \vdots \\ e^{j\psi(k,K_a,1)} & e^{j\psi(k,K_a,2)} & \ldots & e^{j\psi(k,K_a,n_b)} & \ldots & e^{j\psi(k,K_a,N_b)} \end{pmatrix}$$

In the regular spatial sampling scheme, an optimal beam-forming weight matrix for the DoAs is expressed as shown in Equation (15).

$$\underline{W}_{opt}^{(k)} = [\underline{R}_{DOA}^* + N_0 I_{K_a}]^{-1} \underline{B}_s^{(k)*} = [\underline{w}_{opt}^{(k,1)} \underline{w}_{opt}^{(k,2)} \ldots$$
$$w^{opt(k,nb)} \ldots \underline{w}_{opt}^{(k,N_b)}], k=1 \ldots K \quad \text{Equation (15)}$$

In Equation (15), a matrix $\underline{R}_{DOA}$ is a $(K_a * K_a)$ interference power matrix.

When the proposed spatial interpolation in accordance with an exemplary embodiment of the present invention is applied which is different from the conventional regular spatial sampling scheme, a beam-forming direction is mapped to one of the candidate angles of arrivals $\beta_v$ rather than one of the fixed $N_b$ DoAs. In this case, a beam-forming weight must also be changed and the spatial interpolation is applied in the beam-forming step.

When the spatial interpolation is applied, a beam-forming weight for beam-forming of User k is computed in advance, and is given as shown in Equation (16).

$$w_{pSLP}^{(k,nb)}(\beta^{(k)}) = t_{pSLP}(\beta^{(k,nb)} - \beta^{(k)}), k=1 \ldots K, n_b=1.$$
$$N_b \quad \text{Equation (16)}$$

A beam-forming weight applied to Equation (16) is computed using Equation (17). Equation (17) is equal to Equation (6) as described above.

$$t_{pSLP}(\beta) = \frac{1}{N_b}\left[1 + \cos\{N_b\beta/2\} + 2\sum_{v=1}^{(N_b/2)-1} \cos\{v\beta\}\right] \quad \text{Equation (17)}$$

When Equation (16) is expressed in a matrix for all directions, Equation (18) is given.

$$w_{pSLP}^{(k)}(\beta^{(k)}) = [w_{pSLP}^{(k,1)} w_{pSLP}^{(k,2)} \ldots w_{pSLP}^{(k,n_b)}]^T,$$
$$k=1 \ldots K \quad \text{Equation (18)}$$

After the pre-weights are set according to the spatial interpolation in step 630, step 640 is performed to form beams for transmission and reception from the Node B. A description of Step 640 is as follows.

When Equations (18) and (15) are combined, a signal for User k output from the Node B is expressed as shown in Equation (19).

$$\underline{y}_n^{(k)} = \underline{W}_{opt}^{(k)} w_{pSLP}^{(k)}(\beta^{(k)}) d_n^{(k)} \quad \text{Equation (19)}$$
$$= [R_{DOA}^* + N_0 I_{K_a}]^{-1} \underline{B}_s^{(k)*} w_{pSLP}^{(k)}(\beta^{(k)}) d_n^{(k)}$$

In Equation (19), $d_n^{(k)}$ is an n-th symbol to be transmitted to User k.

Next, a second exemplary embodiment for evaluating the energy values in step 610 will be described with reference to FIG. 7B. In accordance with the exemplary embodiment as illustrated in FIG. 7B, the DCIRs obtained in step 600 are used.

In step 730, the AoA determiner 560 generates a plurality of candidate angles of arrival as described with reference to step 710. The generated candidate angles of arrival are transferred to step 740 for evaluating energy values.

In step 740, channel impulse responses $\underline{H}_{d,int.}^{(k)}$ spatially interpolated at the candidate angles of arrival are computed with the directional channel impulse response matrix $\underline{h}_d$ as shown in Equations (20) and (21).

$$\underline{H}_{d,int.}^{(k)} = \hat{\underline{H}}_d^{(k)} T_{pSLP}^{(k)}, k=1 \ldots K \quad \text{Equation (20)}$$

$$\hat{\underline{H}}_d^{(k)} = [\hat{\underline{H}}_d^{(k,1)} \hat{\underline{H}}_d^{(k,2)} \ldots \hat{\underline{H}}_d^{(k,N_b)}], k=1 \ldots K \quad \text{Equation (21)}$$

The spatial interpolation matrix $T_{pSLP}^{(k)}$ is computed by Equations (6) and (8) as described above.

When Equation (20) is expressed by a matrix, Equations (22) and (23) are given.

$$\underline{H}_{d,int.}^{(k)} = [\underline{h}_{d,int.}^{(k,1)} \underline{h}_{d,int.}^{(k,2)} \ldots \underline{h}_{d,int.}^{(k,N_x)}], k=1 \ldots$$
$$K \underline{h}_{d,int.}^{(k,v)} = [[\underline{h}_{d,int.}^{(k,v)}]_1 [\underline{h}_{d,int.}^{(k,v)}]_2 \ldots [$$
$$\underline{h}_{d,int.}^{(k,v)}]_W]^T, k=1 \ldots K, v=1 \ldots N_c \quad \text{Equation (22)}$$

$$\underline{h}_{d,int.}^{(k,v)} = \underline{h}_d^{(k,nb)} t_{pSLP}(\beta^{(k,nb)} - \beta_v), k=1 \ldots K,$$
$$v=1 \ldots N_c \quad \text{Equation (23)}$$

The channel impulse responses computed in the procedure of FIG. 7B are used to determine the primary AoA in step 620. In accordance with this exemplary embodiment, the primary AoA is determined as shown in Equation (24).

$$\beta^{(k)} = \arg\max_{v=1}^{N_c} \{\|\underline{h}_{d,int.}^{(k,v)}\|^2\}, k=1 \ldots K \quad \text{Equation (24)}$$

That is, the primary angles of arrival are determined as candidate angles of arrival at which energy values of the spatially interpolated channel impulse responses are maximal.

The process for selecting the candidate angles of arrival with the maximum energy values as the primary angles of arrival on a user-by-user basis has been described with reference to step 620. In accordance with another exemplary embodiment of the present invention, a Carrier-to-Interference Ratio (CIR) can be used to determine the primary angles of arrival. A CIR at each candidate AoA is expressed as shown in Equation (25).

$$\left(\frac{C}{I}\right)_d^{(k)}(\beta_v) = \frac{E_d^{(k)}(\beta_v)}{\sum_{k_i=1}^{K_i} E_d^{(k_i)}(\beta_v)}, \quad \text{Equation (25)}$$

$$k = 1 \ldots K, v = 1 \ldots N_c$$

When the CIR is used, the primary AoA is selected as shown in Equation (26).

$$\beta^{(k)} = \underset{v=1}{\overset{N_c}{\arg\max}}\left\{\left(\frac{C}{I}\right)_d^{(k)}(\beta_v)\right\}, k = 1\ldots K \qquad \text{Equation (26)}$$

In the other exemplary embodiment of the present invention, the candidate AoA at which the CIR is maximal is selected as the primary AoA.

Similarly, the beam-former 570 computes beam-forming weights (W) based on the spatial interpolation at the angles of arrival computed in the other exemplary embodiment and provides the beam-forming weights (W) to the multipliers 520.

Second Exemplary Embodiment

A second exemplary embodiment as described below determines two angles of arrival closest to the direction in which a user is located, that is, a primary AoA and a secondary AoA, using energy values evaluated at candidate angles of arrival, and computes beam-forming weights (W) at the primary AoA and the secondary AoA.

Figure 8:
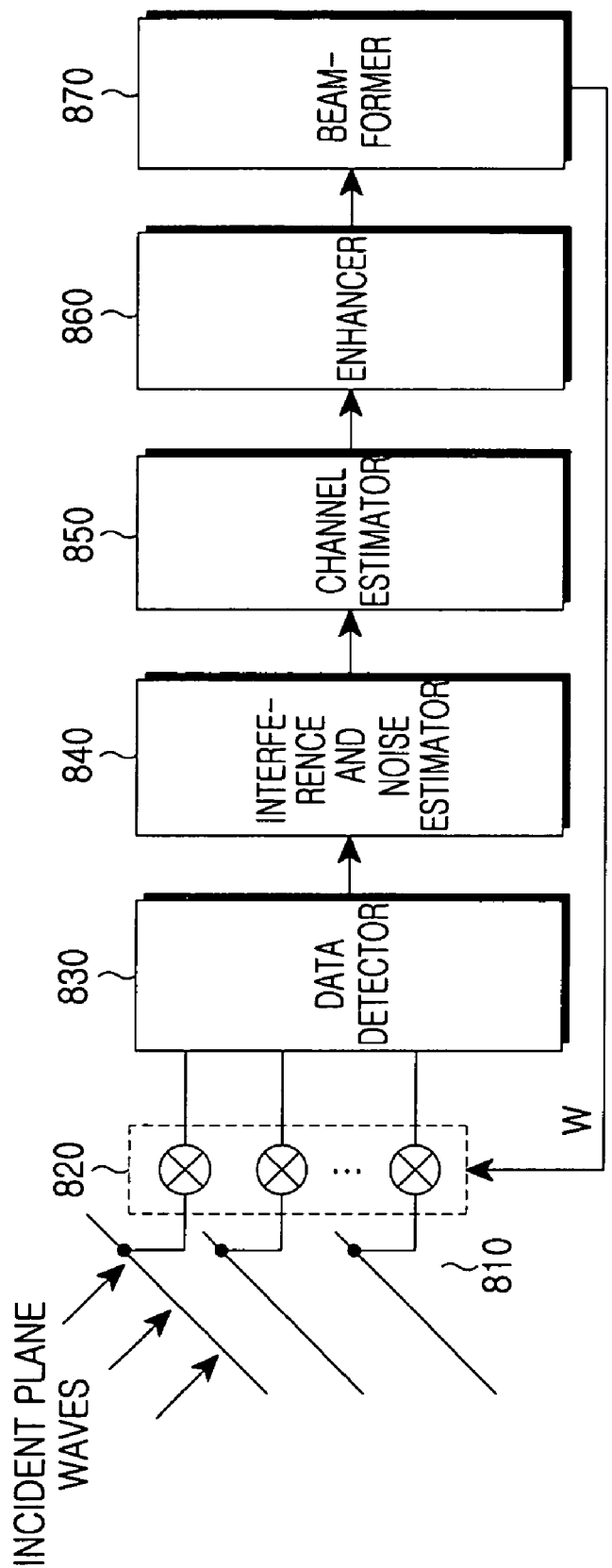
FIG. 8 is a schematic block diagram illustrating a beam-forming transceiver using the spatial interpolation and a secondary angle of arrival in accordance with a second exemplary embodiment of the present invention.

FIG. 8 is a schematic block diagram illustrating a beam-forming transceiver using the spatial interpolation and the secondary AoA in accordance with the second exemplary embodiment of the present invention.

Referring to FIG. 8, a signal received through an array antenna 810, which can comprise incident plane waves received at the antenna elements with different phases, is demodulated to a data signal through a data detector 830. The data signal is input to an interference and noise estimator 840. The interference and noise estimator 840 estimates the interference power and the spectral noise density $N_0$ of the thermal noise power using the provided data signal. An output of the interference and noise estimator 840 is input to a channel estimator 850. The channel estimator 850 computes channel impulse response information. The channel impulse responses are computed on the basis of antenna elements and users for performing communication through the array antenna 810. As a result, an output of the channel estimator 850 is an estimation matrix of the channel impulse responses.

The channel impulse responses estimated in the channel estimator 850 are input to an enhancer 860 for determining primary and secondary angles of arrival using a spatial interpolation and an SNR. Functions of the enhancer 860 are as follows:

1. Evaluate an energy value in every path of arrival;
2. Generate candidate angles of arrival that are more than the number of antenna elements;
3. Evaluate energy per candidate AoA using the spatial interpolation;
4. Evaluate energy at each candidate AoA using the spatial interpolation and a DCIR; and
5. Determine a primary AoA and a secondary AoA.

The functions will be described in more detail with reference to FIG. 9. When the primary and secondary angles of arrival are determined, the enhancer 860 inputs the primary and secondary angles of arrival to a beam-former 870. Then, the beam-former 870 sets proper weights (W) on an antenna element-by-antenna-element basis according to the primary and secondary angles of arrival and provides the weights (W) to multipliers 820, such that antenna elements form beams in associated directions.

Figure 9:
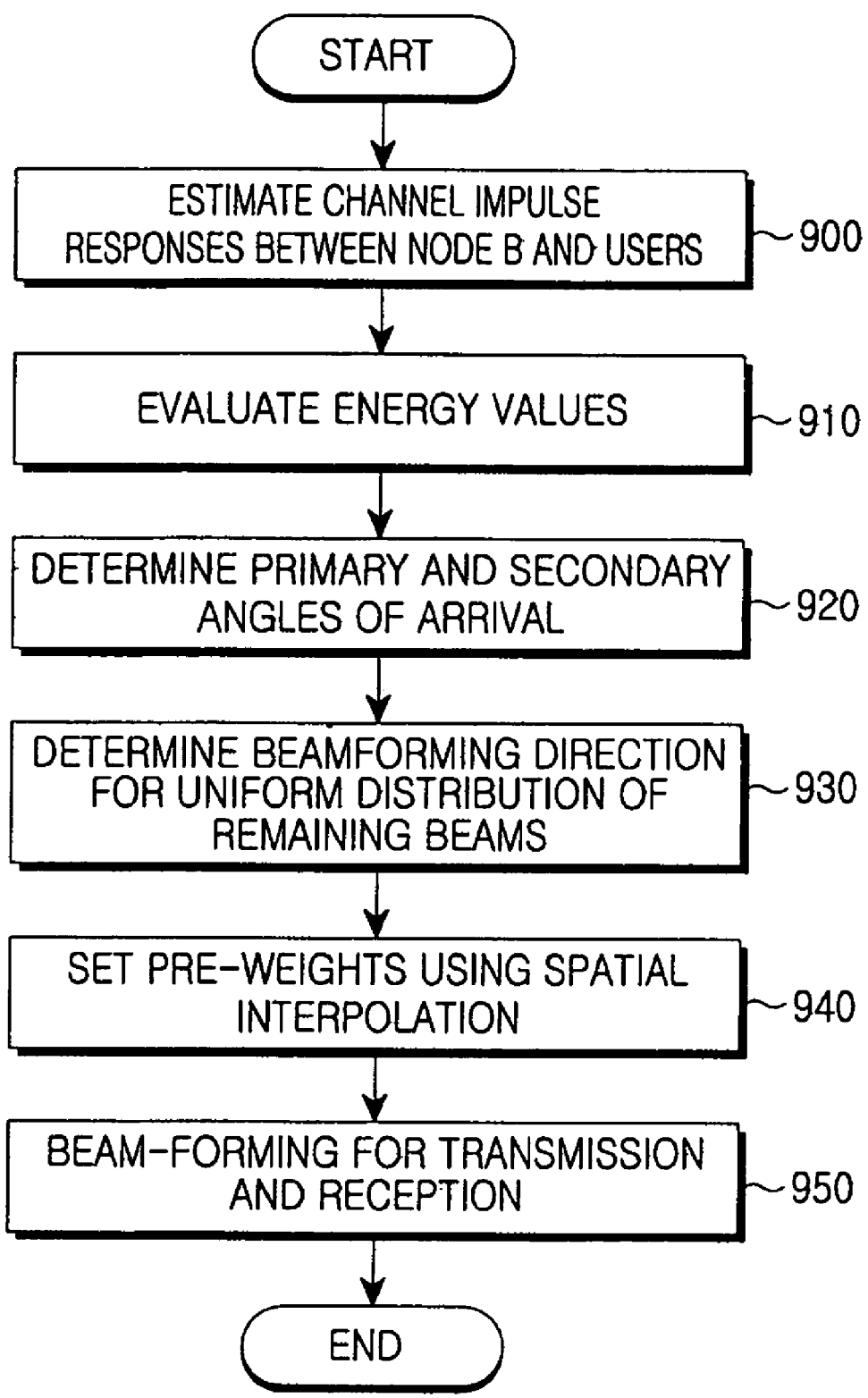
FIG. 9 is a schematic flowchart illustrating a beam-forming procedure using the spatial interpolation and the secondary angle of arrival in accordance with the second exemplary embodiment of the present invention.

FIG. 9 is a schematic flowchart illustrating a beam-forming procedure using the spatial interpolation in accordance with the second exemplary embodiment of the present invention. An operation will be described step by step.

Referring to FIG. 9, the channel estimator 850 estimates directional channel impulse responses $\underline{h}_d$ between users and antenna elements of a Node B in step 900. $\underline{h}_d$ is a matrix with elements of $\underline{\hat{h}}^{(k,n_a)}$ according to User k and Antenna Element $n_b$. Subscript d denotes the directivity and a hat ^ denotes an estimated value. The magnitude of the directional channel impulse response matrix depends on the number of beams, that is, the number of antenna elements and the number of users. The estimated directional channel impulse responses are transferred to step 910 of evaluating energy values at angles of arrival.

In accordance with an exemplary embodiment of the present invention, the enhancer 860 can perform step 910 to evaluate the energy values at the angles of arrival according to a procedure as illustrated in FIG. 7A or 7B. The same results can be obtained when the procedures of FIGS. 7A and 7B evaluate the energy values in step 910 of FIG. 9. Both the procedures of FIGS. 7A and 7B do not need to be performed.

First, the operation for evaluating the energy values in accordance with the first exemplary embodiment as illustrated in FIG. 7A is as follows. In step 700, the energy values are estimated with the estimated directional channel impulse responses. An energy value between User k and Antenna Element $n_b$ is estimated according to the directional channel impulse responses as shown in Equation (27).

$$\hat{E}_d^{(k,nb)} = \|\underline{\hat{h}}_d^{(k,nb)}\|^2 \qquad \text{Equation (27)}$$

After the energy values are estimated in step 700, candidate angles of arrival are generated in step 710. Specifically, step 710 generates $N_c$ candidate angles of arrival that are more than the number of beams, $N_b$, identical with the number of antenna elements. When a v-th candidate AoA is denoted by $\beta_v$, it is expressed as shown in Equation (28).

$$\beta_v = \frac{2\pi}{N_c}(v-1) \qquad \text{Equation (28)}$$

$$v = 1 \ldots N_c \quad N_c > N_b$$

A set of the generated candidate angles of arrival is used for energy evaluation at each candidate AoA in step 720. In step 720, an energy value at each candidate AoA is computed using a spatial interpolation. Step 720 is as follows.

That is, the enhancer 860 computes Equation (29) with the energy values computed in step 910 and the candidate angles of arrival generated in step 920.

$$E_d^{(k)}(\beta_v) = \sum_{n_b=1}^{N_b} \hat{E}_d^{(k,n_b)} t_{pSLP}(\beta^{(k,n_b)} - \beta_v) \qquad \text{Equation (29)}$$

$$k = 1 \ldots K, v = 1 \ldots N_c$$

In Equation (29), $E_d^{(k)}(\beta_v)$ is an energy value of User k evaluated at the candidate AoA $\beta_v$, and $\beta^{(k,n_b)}$ is a beam-forming angle for a spatial signal $n_b$ of User k as shown in Equation (2). $t_{pSLP}$ of Equation (29) is a spatial interpolation coefficient for applying a spatial interpolation based on pSLP, and is defined as shown in Equation (30).

$$t_{pSLP}(\beta) = \frac{1}{N_b}\left[1 + \cos\{N_b\beta/2\} + 2\sum_{v=1}^{(N_b/2)-1}\cos\{v\beta\}\right] \quad \text{Equation (30)}$$

In Equation (30), the spatial interpolation coefficient has a constant value of $2/N_b$ at an antenna element's angle ($\beta=\beta^{(k,n_b)}$) among candidate angles of arrival according to regular spatial sampling, but has a median value between known interpolation coefficients at adjacent DoAs, as to coefficients at other angles. As a result, a median value between energy values at the known adjacent DoAs is taken in relation to an angle at which an antenna element is not deployed. This is based on gradual variations rather than sudden variations in spatial characteristics according to angular variations. In other words, the spatial interpolation technique computes a median energy value according to angular variations.

When the energy values estimated in step 700 are denoted in the form of a vector, it is expressed as shown in Equation (31).

$$\underline{\epsilon}_d^{(k)} = [\hat{E}_d^{(k,1)} \hat{E}_d^{(k,2)} \ldots \hat{E}_d^{(k,nb)} \ldots \hat{E}_d^{(k,N_b)}]^T,$$
$$k=1 \ldots K \quad \text{Equation (31)}$$

Spatial interpolation coefficients used in step 720 are expressed as a spatial interpolation matrix $T_{pSLP}^{(k)}$ as shown in Equation (32).

$$T_{pSLP}^{(k)} = \begin{bmatrix} t_{pSLP}(\beta^{(k,1)} - \beta_1) & t_{pSLP}(\beta^{(k,1)} - \beta_2) & \cdots & t_{pSLP}(\beta^{(k,1)} - \beta_{N_c}) \\ t_{pSLP}(\beta^{(k,2)} - \beta_1) & t_{pSLP}(\beta^{(k,2)} - \beta_2) & & t_{pSLP}(\beta^{(k,2)} - \beta_{N_c}) \\ \vdots & \vdots & \ddots & \vdots \\ t_{pSLP}(\beta^{(k,N_b)} - \beta_1) & t_{pSLP}(\beta^{(k,N_b)} - \beta_2) & \cdots & t_{pSLP}(\beta^{(k,N_b)} - \beta_{N_c}) \end{bmatrix},$$
$$k = 1 \ldots K \quad \text{Equation (32)}$$

A matrix of energy values at candidate angles of arrival computed by Equations (31) and (32) in step 720 is given as shown in Equation (33).

$$\epsilon_{d,int.}^{(k)T} = \hat{\epsilon}_d^{(k)T} T_{pSLP}^{(k)} = [E_d^{(k)}(\beta_{1_c}) E_d^{(k)}(\beta_{2_c}) \ldots E_d^{(k)}(\beta_v) \ldots E_d^{(k)}(\beta_{N_c})]^T, k=1 \ldots K \quad \text{Equation (33)}$$

As a result, the enhancer 860 obtains energy values at the candidate angles of arrival in step 720.

The energy values computed at the candidate angles of arrival obtained according to the procedure of FIG. 7A are used to determine primary and secondary angles of arrival in step 920. The enhancer 860 determines the primary and secondary angles of arrival on the basis of the energy values computed at the candidate angles of arrival in step 920. A basic determination criterion is to select one AoA with the maximum energy value and the other AoA with the next maximum energy value by comparing the energy values at the candidate angles of arrival. Step 920 is defined as shown in Equations (34) and (35).

$$\beta'^{(k)} = \arg\max_{v=1}^{N_c}\{E_d^{(k)}(\beta_v)\}, \quad k=1\ldots K \quad \text{Equation (34)}$$

$$\beta''^{(k)} = \arg\max_{v=1, v\neq v'}^{N_c}\{E_d^{(k)}(\beta_v)\}, \quad k=1\ldots K \quad \text{Equation (35)}$$

Equation (34) is used in a process for selecting a candidate AoA with the maximum energy value for each user as a primary AoA $\beta'^{(k)}$ of User k. For convenience, an index of a candidate AoA determined as the primary AoA is denoted by v'.

In Equation (35), the secondary AoA $\beta''^{(k)}$ is selected as a v"-th candidate AoA with the maximum energy value among the remaining candidate angles of arrival except the v'-th candidate AoA, that is, the primary AoA.

That is, in step 920, the candidate angles of arrival are arranged in descending order of the energy values, and the candidate AoA with the maximum energy value and the candidate AoA with the next maximum energy value are selected as the primary AoA and the secondary AoA, respectively.

When the primary and secondary angles of arrival are determined in step 920, the beam-former 870 sets beam-forming directions while considering a uniform distribution of the remaining beams in step 930. The distribution process of the remaining beams uniformly distributes the remaining $N_b-2$ beams, except the two beams allocated at the primary and secondary angles of arrival, between the primary AoA $\beta'^{(k)}$ and the secondary AoA $\beta''^{(k)}$. An example of typical beam-forming is the same as described above. In results of the above-described process, new beam-forming directions and new beam-forming weights are determined by Equation (36).

$$\beta'^{(k,nb)}, n_b=1 \ldots N_b, k=1 \ldots K \, w_{pSLP}^{(k,nb)}(\beta'^{(k,nb)}) = t_{pSLP}(\beta'^{(k,n)}), k=1 \ldots K, n_b=1 \ldots N_b \quad \text{Equation (36)}$$

The new beam-forming directions are set as $N_b$ values with a uniform interval between the primary AoA and the secondary AoA. A spatial interpolation coefficient $t_{pSLP}$ applied to Equation (36) is defined as shown in Equation (17) as described above.

In step 940, the beam-former 870 sets pre-weights for beam-forming on the basis of two angles of arrival selected for each user basis.

When the spatial interpolation proposed in the present invention is applied which is different from the conventional regular spatial sampling scheme as shown in Equations (11) to (15), a beam-forming direction is present between two angles selected from the candidate angles of arrival $\beta_v$ rather than the fixed $N_b$ DoAs. A new beam-forming direction is defined by Equation (36). In this case, a beam-forming weight is also changed as shown in Equation (36) and the spatial interpolation is applied in the beam-forming step.

After the pre-weights are set according to the spatial interpolation in step 940, step 950 is performed to form beams for transmission and reception from the Node B. That is, a signal to be transmitted from the Node B to User k is defined as shown in Equation (19).

Next, a second exemplary embodiment for evaluating the energy values will be described with reference to FIG. 7B. In accordance with the exemplary embodiment as illustrated in FIG. 7B, the DCIRs obtained in step 900 are used.

In step 730, the enhancer 860 generates a plurality of candidate angles of arrival as described with reference to step 710. The generated candidate angles of arrival are transferred to step 740 of evaluating the energy values.

In step 740, channel impulse responses $\underline{H}_{d,int.}^{(k)}$ spatially interpolated at the candidate angles of arrival are computed with the directional channel impulse response matrix hd as shown in Equations (20) and (21).

The spatially interpolated channel impulse responses computed in the procedure of FIG. 7B are used to determine the primary AoA and the secondary AoA in step 920. In accordance with another exemplary embodiment of the present invention, the primary AoA is determined as shown in Equation (37).

$$\beta'^{(k)} = \operatorname*{argmax}_{v=1}^{N_c} \{\|\underline{h}_{d,int.}^{(k,v)}\|^2\} \quad \text{Equation (37)}$$

For convenience, an index of the primary AoA is denoted by v'. The secondary AoA is determined as shown in Equation (38).

$$\beta''^{(k)} = \arg \max_{v=1, v \neq v'}^{N_c} \{\|\underline{h}_{d,int.}^{(k,v)}\|^2\} \quad \text{Equation (38)}$$

In Equation (38), the secondary AoA $\beta''^{(k)}$ is selected as a v''-th candidate AoA with the maximum channel impulse response energy value among the remaining candidate angles of arrival except the v'-th candidate AoA, in other words, the primary AoA. That is, in step 920, the candidate angles of arrival are arranged in descending order of the channel impulse response energy values, and the candidate AoA with the maximum energy value and the candidate AoA with the next maximum energy value are selected as the primary AoA and the secondary AoA, respectively.

When the primary and secondary angles of arrival are determined, beam-forming is performed at the angles of arrival as described above.

As is apparent from the above description, exemplary embodiments of the present invention have the following effects.

Exemplary implementations of the present invention apply a spatial interpolation to a regular spatial sampling scheme capable of simplifying a structure of a beam-forming system, thereby improving system performance without an additional antenna element. Moreover, exemplary implementations of the present invention improve performance with a small increase in computation amount.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A beam-forming apparatus for an antenna diversity system with an array antenna configured by a plurality of antenna elements, the apparatus comprising:

a noise calculator for estimating a noise power of the radio channel;

a channel estimator for estimating directional channel impulse responses at beam-forming angles mapped to the antenna elements using the noise power;

an angle of arrival (AoA) determiner for generating a plurality of candidate angles of arrival, the number of the candidate angles of arrival being more than the number of the antenna elements, applying a spatial interpolation to energy values at the beam-forming angles according to the estimated directional channel impulse responses, evaluating the energy values at the candidate angles, and selecting a primary angle of arrival among the candidate angles of arrival according to the evaluated energy values; and a beam-former for computing beam-forming weights based on differences between the beam-forming angles and the selected primary angle of arrival, and applying the beam-forming weights to the plurality of antenna elements of the array antenna.

2. The beam-forming apparatus of claim 1, wherein the AoA determiner takes a median value between the beam-forming angles adjacent to each other as an energy value at a candidate angle of arrival that is not mapped to one of the plurality of antenna elements among the candidate angles of arrival.

3. The beam-forming apparatus of claim 1, wherein the AoA determiner selects a candidate angle of arrival at which an energy value computed for each user is maximal as the primary angle of arrival, the energy value being computed by:

$$E_d^{(k)}(\beta_v) = \sum_{n_b=1}^{N_b} \hat{E}_d^{(k,n_b)} t_{pSLP}(\beta^{(k,n_b)} - \beta_v),$$

$$k = 1 \ldots K, \quad v = 1 \ldots N_c,$$

where $E_d^{(k,n_b)}$ is an energy value of a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

4. The beam-forming apparatus of claim 1, wherein the AoA determiner selects a candidate angle of arrival at which an energy value of a spatial interpolation channel impulse response computed for each user is maximal as the primary angle of arrival, the spatial interpolation channel impulse response being computed by:

$$\underline{h}_{d,int.}^{(k,v)} = \underline{\hat{h}}_d^{(k,nb)} t_{pSLP}(\beta^{(k,nb)} - \beta_v), k=1 \ldots K,$$
$$v=1 \ldots N_c,$$

where $\underline{\hat{h}}_d^{(k,n_b)}$ is a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

5. The beam-forming apparatus of claim 1, wherein the AoA determiner selects a candidate angle of arrival at which a carrier-to-interference ratio computed for each user is maximal as the primary angle of arrival, the carrier-to-interference ratio being computed by:

$$\left(\frac{C}{I}\right)_d^{(k)}(\beta_v) = \frac{E_d^{(k)}(\beta_v)}{\sum_{k_i=1}^{K_i} E_d^{(k_i)}(\beta_v)}, \quad k=1\ldots K, \quad v=1\ldots N_c$$

and $$E_d^{(k)}(\beta_v) = \sum_{n_b=1}^{N_b} \hat{E}_d^{(k,n_b)} t_{pSLP}(\beta^{(k,n_b)} - \beta_v),$$

$$k=1\ldots K, \quad v=1\ldots N_c,$$

where $\hat{E}_d^{(k,n_b)}$ is an energy value of a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

6. The beam-forming apparatus of claim 1, wherein the beam-former computes weights based on differences between the angles of arrival and the selected primary angle of arrival, the weights being computed by:

$$w_{pSLP}^{(k,n_b)}(\beta^{(k)}) = t_{pSLP}(\beta^{(k,n_b)} - \beta^{(k)}), \quad k=1\ldots K, \quad n_b=1\ldots N_b,$$

where $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

7. The beam-forming apparatus of claim 3, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

8. The beam-forming apparatus of claim 4, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

9. The beam-forming apparatus of claim 5, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

10. The beam-forming apparatus of claim 6, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

11. A beam-forming method for an antenna diversity system with an array antenna configured by a plurality of antenna elements, the method comprising:

estimating a noise power of the radio channel;

estimating directional channel impulse responses at beam-forming angles mapped to the plurality of antenna elements using the noise power;

setting a plurality of candidate angles of arrival, the number of the candidate angles of arrival being more than the number of the antenna elements, applying a spatial interpolation to energy values at the beam-forming angles according to the estimated directional channel impulse responses, evaluating the energy values at the candidate angles, and selecting a primary angle of arrival among the candidate angles of arrival according to the evaluated energy values; and computing beam-forming weights based on differences between the beam-forming angles and the selected primary angle of arrival, applying the beam-forming weights to the plurality of antenna elements of the array antenna, and performing beam-forming.

12. The beam-forming method of claim 11, further comprising:

taking a median value between the beam-forming angles adjacent to each other as an energy value at a candidate angle of arrival that is not mapped to one of the plurality of antenna elements among the candidate angles of arrival.

13. The beam-forming method of claim 11, wherein selecting the primary angle of arrival comprises:

selecting a candidate angle of arrival at which an energy value computed for each user is maximal as the primary angle of arrival, the energy value being computed by:

$$E_d^{(k)}(\beta_v) = \sum_{n_b=1}^{N_b} \hat{E}_d^{(k,n_b)} t_{pSLP}(\beta^{(k,n_b)} - \beta_v),$$

$$k=1\ldots K, \quad v=1\ldots N_c,$$

where $\hat{E}_d^{(k,n_b)}$ is an energy value of a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

14. The beam-forming method of claim 11, wherein selecting the primary angle of arrival comprises:

selecting a candidate angle of arrival at which an energy value of a spatial interpolation channel impulse response computed for each user is maximal as the primary angle of arrival, the spatial interpolation channel impulse response being computed by:

$$\hat{h}_{d,int.}^{(k,v)} = \hat{h}_d^{(k,n_b)} t_{pSLP}(\beta^{(k,n_b)} - \beta_v), \quad k=1 \ldots K, \quad v=1 \ldots N_c,$$

where $\hat{h}_d^{(k,n_b)}$ is a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

15. The beam-forming method of claim 11, wherein selecting the primary angle of arrival comprises:

selecting a candidate angle of arrival at which a carrier-to-interference ratio computed for each user is maximal as the primary angle of arrival, the carrier-to-interference ratio being computed by:

$$\left(\frac{C}{I}\right)_d^{(k)}(\beta_v) = \frac{E_d^{(k)}(\beta_v)}{\sum_{k_i=1}^{K_i} E_d^{(k_i)}(\beta_v)}, \quad k=1 \ldots K, \quad v=1 \ldots N_c,$$

and $$E_d^{(k)}(\beta_v) = \sum_{n_b=1}^{N_b} \hat{E}_d^{(k,n_b)} t_{pSLP}(\beta^{(k,n_b)} - \beta_v),$$

$$k=1 \ldots K, \quad v=1 \ldots N_c,$$

where $\hat{E}_d^{(k,n_b)}$ is an energy value of a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

16. The beam-forming method of claim 11, wherein performing the beam-forming comprises:

computing weights based on differences between the angles of arrival and the selected primary angle of arrival, the weights being computed by:

$$w_{pSLP}^{(k,nb)}(\beta^{(k)}) = t_{pSLP}(\beta^{(k,nb)} - \beta^{(k)}), \quad k=1 \ldots K, \quad n_b=1 \ldots N_b,$$

where $t_{pSLP}$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

17. The beam-forming method of claim 13, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

18. The beam-forming method of claim 14, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

19. The beam-forming method of claim 15, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

20. The beam-forming method of claim 16, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

21. A beam-forming apparatus for an antenna diversity system with an array antenna configured by a plurality of antenna elements, the apparatus comprising:

a noise calculator for estimating a noise power of the radio channel;

a channel estimator for estimating directional channel impulse responses at beam-forming angles mapped to the plurality of antenna elements using the noise power;

an angle of arrival (AoA) determiner for generating a plurality of candidate angles of arrival, the number of the candidate angles of arrival being more than the number of the antenna elements, applying a spatial interpolation to energy values at the beam-forming angles according to the estimated directional channel impulse responses, evaluating the energy values at the candidate angles, and selecting primary and secondary angles of arrival closest to a direction in which the user is located among the candidate angles of arrival according to the evaluated energy values; and a beam-former for computing beam-forming weights based on the beam-forming angles and the selected primary and secondary angles of arrival, and applying the beam-forming weights to the plurality of antenna elements of the array antenna, such that beams are uniformly distributed between the primary and secondary angles of arrival.

22. The beam-forming apparatus of claim 21, wherein the AoA determiner takes a median value between the beam-forming angles adjacent to each other as an energy value at a candidate angle of arrival that is not mapped to one of the plurality of antenna elements among the candidate angles of arrival.

23. The beam-forming apparatus of claim 21, wherein the AoA determiner selects two candidate angles of arrival at which an energy value computed for each user is maximal as the primary and secondary angles of arrival, the energy value being computed by:

$$E_d^{(k)}(\beta_v) = \sum_{n_b=1}^{N_b} \hat{E}_d^{(k,n_b)} t_{pSLP}(\beta^{(k,n_b)} - \beta_v),$$
$$k = 1 \ldots K, v = 1 \ldots N_c,$$

where $\hat{E}_d^{(k,n_b)}$ is an energy value of a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

24. The beam-forming apparatus of claim 21, wherein the AoA determiner selects two candidate angles of arrival at which an energy value of a spatial interpolation channel impulse response computed for each user is maximal as the primary and secondary angles of arrival, the spatial interpolation channel impulse response being computed by:

$$\underline{h}_{d,int.}^{(k,v)} = \underline{h}_d^{(k,n_b)} t_{pSLP}(\beta^{(k,n_b)} - \beta_v), k=1 \ldots K,$$
$$v=1 \ldots N_c,$$

where $\hat{h}_d^{(k,n_b)}$ is a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

25. The beam-forming apparatus of claim 21, wherein the AoA determiner selects two candidate angles of arrival at which a carrier-to-interference ratio computed for each user is maximal as the primary and secondary angles of arrival, the carrier-to-interference ratio being computed by:

$$\left(\frac{C}{I}\right)_d^{(k)}(\beta_v) = \frac{E_d^{(k)}(\beta_v)}{\sum_{k_i=1}^{K_i} E_d^{(k_i)}(\beta_v)},$$

$$k = 1 \ldots K, v = 1 \ldots N_c$$

and $$E_d^{(k)}(\beta_v) = \sum_{n_b=1}^{N_b} \hat{E}_d^{(k,n_b)} t_{pSLP}(\beta^{(k,n_b)} - \beta_v),$$
$$k = 1 \ldots K, v = 1 \ldots N_c,$$

where $\hat{E}_d^{(k,n_b)}$ is an energy value of a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

26. The beam-forming apparatus of claim 21, wherein the beam-former sets a new beam-forming direction based on the primary and secondary angles of arrival and computes weights based on the angles of arrival and the new beam-forming direction, the weights being computed by:

$$w_{pSLP}^{(k,n_b)}(\beta'^{(k,n_b)}) = t_{pSLP}(\beta'^{(k,n_b)}), k=1 \ldots K,$$
$$n_b=1 \ldots N_b,$$

where $t_{pSLP}(\beta)$ is a spatial interpolation coefficient at an angle of arrival $\beta$, $\beta'^{(k,n_b)}$ is a new beam-forming direction for a user k and an $n_b$-th antenna element, K is the number of users communicating with the system, $N_b$ is the number of antenna elements, and $N_c$ is the number of candidate angles of arrival.

27. The beam-forming apparatus of claim 23, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

28. The beam-forming apparatus of claim 24, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

29. The beam-forming apparatus of claim 25, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

30. The beam-forming apparatus of claim 26, wherein the spatial interpolation coefficient is computed by:

$$t_{pSLP}(\beta) = \frac{1}{N_b}\left[1 + \cos\{N_b\beta/2\} + 2\sum_{v=1}^{(N_b/2)-1} \cos\{v\beta\}\right].$$

31. A beam-forming method for an antenna diversity system with an array antenna configured by a plurality of antenna elements, the method comprising:
estimating a noise power of the radio channel;
estimating directional channel impulse responses at beam-forming angles mapped to the plurality of antenna elements using the noise power;
setting a plurality of candidate angles of arrival, the number of the candidate angles of arrival being more than the number of the antenna elements, applying a spatial interpolation to energy values at the beam-forming angles according to the estimated directional channel impulse responses, evaluating the energy values at the candidate angles, and selecting primary and secondary angles of arrival closest to a direction in which the user is located among the candidate angles of arrival according to the evaluated energy values; and
computing beam-forming weights based on the beam-forming angles and the selected primary and secondary angles of arrival, applying the beam-forming weights to the plurality of antenna elements of the array antenna, and performing beam-forming, such that beams are uniformly distributed between the primary and secondary angles of arrival.

32. The beam-forming method of claim 31, further comprising:

taking a median value between the beam-forming angles adjacent to each other as an energy value at a candidate angle of arrival that is not mapped to one of the plurality of antenna elements among the candidate angles of arrival.

33. The beam-forming method of claim 31, wherein selecting the primary and secondary angles of arrival comprises:
selecting two candidate angles of arrival at which an energy value computed for each user is maximal as the primary and secondary angles of arrival, the energy value being computed by:

$$E_d^{(k)}(\beta_v) = \sum_{n_b=1}^{N_b} \hat{E}_d^{(k,n_b)} t_{pSLP}(\beta^{(k,n_b)} - \beta_v),$$
$$k = 1 \ldots K, v = 1 \ldots N_c,$$

where $\hat{E}_d^{(k,n_b)}$ is an energy value of a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

34. The beam-forming method of claim 31, wherein selecting the primary and secondary angles of arrival comprises:
selecting two candidate angles of arrival at which an energy value of a spatial interpolation channel impulse response computed for each user is maximal as the primary and secondary angles of arrival, the spatial interpolation channel impulse response being computed by:

$$\underline{h}_{d,int.}^{(k,v)} = \underline{h}_d^{(k,n_b)} t_{pSLP}(\beta^{(k,n_b)} - \beta_v), k=1 \ldots K,$$
$$v=1 \ldots N_c,$$

where $\underline{h}_d^{(k,n_b)}$ is a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for a user k and an $n_b$-th antenna element, K is the number of users communicating with the system, $N_b$ is the number of antenna elements, and $N_c$ is the number of candidate angles of arrival.

35. The beam-forming method of claim 31, wherein selecting the primary and secondary angles of arrival comprises:
selecting two candidate angles of arrival at which a carrier-to-interference ratio computed for each user is maximal as the primary and secondary angles of arrival, the carrier-to-interference ratio being computed by:

$$\left(\frac{C}{I}\right)_d^{(k)}(\beta_v) = \frac{E_d^{(k)}(\beta_v)}{\sum_{k_i=1}^{K_i} E_d^{(k_i)}(\beta_v)}, k = 1 \cdots K, v = 1 \cdots N_c \text{ and}$$

$$E_d^{(k)}(\beta_v) = \sum_{n_b=1}^{N_b} \hat{E}_d^{(k,n_b)} t_{pSLP}(\beta^{(k,n_b)} - \beta_v), k = 1 \cdots K, v = 1 \cdots N_e,$$

where $\hat{E}_d^{(k,n_b)}$ is an energy value of a directional channel impulse response for a user k and an $n_b$-th antenna element, $t_{pSLP}(\beta)$ is a spatial interpolation coefficient at an angle of arrival $\beta$, $\beta^{(k,n_b)}$ is a beam-forming angle for the user k and the $n_b$-th antenna element, K is the number of users communicating with the system, $N_b$ is the number of antenna elements, and $N_c$ is the number of candidate angles of arrival.

36. The beam-forming method of claim 31, wherein performing the beam-forming comprises:
setting a new beam-forming direction based on the primary and secondary angles of arrival and computing weights based on the angles of arrival and the new beam-forming direction, the weights being computed by:

$$w_{pSLP}^{(k,n_b)}(\beta'^{(k,n_b)}) = t_{pSLP}(\beta'^{(k,n_b)}), k=1 \ldots K,$$
$$n_b=1 \ldots N_b,$$

where $t_{pSLP}(\beta)$ is a spatial interpolation coefficient at an angle of arrival $\beta$, $\beta'^{(k,n_b)}$ is a new beam-forming direction for the user k and the $n_b$-th antenna element, K is the number of users communicating with the system, $N_b$ is the number of antenna elements, and $N_c$ is the number of candidate angles of arrival.

37. The beam-forming method of claim 33, wherein the spatial interpolation coefficient is computed by:

$$t_{pSLP}(\beta) = \frac{1}{N_b}\left[1 + \cos\{N_b \beta/2\} + 2\sum_{v=1}^{(N_b/2)-1} \cos\{v\beta\}\right].$$

38. The beam-forming method of claim 34, wherein the spatial interpolation coefficient is computed by:

$$t_{pSLP}(\beta) = \frac{1}{N_b}\left[1 + \cos\{N_b \beta/2\} + 2\sum_{v=1}^{(N_b/2)-1} \cos\{v\beta\}\right].$$

39. The beam-forming method of claim 35, wherein the spatial interpolation coefficient is computed by:

$$t_{pSLP}(\beta) = \frac{1}{N_b}\left[1 + \cos\{N_b \beta/2\} + 2\sum_{v=1}^{(N_b/2)-1} \cos\{v\beta\}\right].$$

40. The beam-forming method of claim 36, wherein the spatial interpolation coefficient is computed by:

$$t_{pSLP}(\beta) = \frac{1}{N_b}\left[1 + \cos\{N_b \beta/2\} + 2\sum_{v=1}^{(N_b/2)-1} \cos\{v\beta\}\right].$$

* * * * *